May 12, 1942.  H. GROPLER ET AL  2,282,516

AIRPLANE WING STRUCTURE

Filed July 7, 1939

Inventors,
HANS GROPLER AND
ERWIN HANDKE.

by Gerald F. Baldwin
Atty.

Patented May 12, 1942

2,282,516

UNITED STATES PATENT OFFICE 2,282,516

AIRPLANE WING STRUCTURE

Hans Gropler and Erwin Handke, Dessau, Germany, assignors to Junkers Flugzeug-und-Motorenwerke Aktiengesellschaft, Dessau, Germany, a corporation of Germany Application July 7, 1939, Serial No. 283,257
In Germany July 11, 1938

9 Claims. (Cl. 244—42)

This invention relates to improvements in airplane wing structures, and refers particularly to wing structures with means for suction and discharge of air from the skin layer. This suction or discharge is required when the whole or a part of the wings are inclined at a considerable angle of incidence as when starting or landing, at which time it is very desirable that banking efficiency is not reduced by such suction or discharge of air from the skin layer.

This invention aims to provide a wing structure to solve this problem, wherein angularly adjustable flaps are supported rearwardly of the main wings between the latter and ailerons for banking so that the flaps may be employed for covering or exposing openings in the main wings through which suction or discharge of air from the skin layer may be effected.

Another object of the invention is to provide such a wing structure wherein the ailerons, for simplicity of construction, are pivoted on the flaps. When starting or landing the latter are at an inclination to the main wings in order to expose the openings in said wings and permit suction or discharge therethrough so that the ailerons which are at all times spaced from the flaps may be operated without fear of disrupting or tearing the skin layer. Moreover, since the flaps are arranged to cover or expose, that is open or close, the openings it is desirable that they be transversely located behind the sharpest curve on the rear portion of the main wings.

A further object of the invention is to provide such a wing structure wherein the operating mechanism is so constructed that the laterally disposed operating rods for moving the flaps are protected from stresses and strains when the flaps have been turned to their limits of pivotal movement in either direction.

Having thus briefly stated some of the objects and advantages of the invention we will proceed to describe the invention with the aid of the accompanying drawing, in which.

Figure 1:
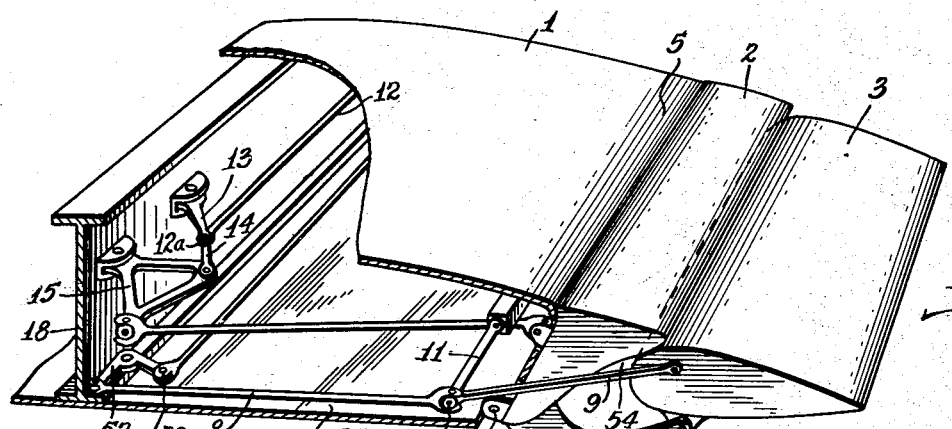
Figure 1 illustrates a perspective view of a portion of a main wing with a flap and aileron in normal flight position.

The wing arrangement consists of a main wing 1 having a flap 2 pivotally supported rearwardly therefrom and an aileron 3 pivotally supported from the flap 2 so that a transverse slot 54 is formed between them. Formed transversely of the main wing 1 and within the latter in the rearward portion thereof is a passage 33 for the transfer of air to or from the skin layer.

The flap 2 is positioned adjacent the rear face of the main wing 1 opposite its portion 5 of greatest rearward curvature, and adjacent this portion 5 of the main wing a plurality of openings 6 are formed therethrough which communicate with the passage 33. When the flap 2 is in the normal flight position shown in Figure 1 these openings 6 are closed by the adjacent portion of the said flap, but when the latter is moved to its inclined position shown in Figure 2, a transverse and substantially V-shaped groove 4 is formed between the portion of the wing surface through which the openings 6 occur and the adjacent face of the flap 2, so that when the flap is inclined air may be drawn by suction into the passage 33 or discharged therefrom through the openings 6 and the groove 4 by any preferred means (not shown), to maintain an aerodynamic flow and protect the skin layer against disruption or tearing.

By the mechanism hereinafter described provision is made: One, for moving both the flap 2 and the aileron 3 together, by movement of an operating rod 12; two, for moving the aileron in the opposite direction to the flap 2 also by movement of the operating rod 12; or three, for moving the aileron 3 independently of the flap 2 by movement of the operating lever 50, either while the flap is being moved or while it remains stationary.

We will now describe the construction and operation of the mechanism by which the flap 2 and aileron 3 are moved. Movement of the operating rod 12 in every case imparts movement both to the flap 2 and aileron 3, whereas movement of the operating rod 50 only moves the aileron 3 relative to flap 2. The rods 12 and 50 may be operated from any suitable control location—not shown. One extremity of the rod 12 is pivotally connected by a pin 12a to one extremity of an arm 13 the opposite end of which is pivotally mounted upon a suitable portion of the main wing, in the present instance to the beam 18 which forms one wall of the passage 33. One extremity of a link 14 is also pivotally mounted on the pin 12a and the opposite extremity of the said link is pivoted to one corner of a triangular member 16. A second corner of this member is pivotally mounted on the beam 18, and to its third corner one extremity of a reach rod 17 is pivotally mounted; the opposite end of the reach rod 17 is pivotally mounted to the flap 2, which is pivotally supported by the main wing 1 by pins 11'; extending from the flap 2 are downwardly and rearwardly disposed brackets 51 on the outer extremities of which the aileron 3 is pivotally supported.

The operating rod 50 is connected at one extremity to one arm of a bell crank 52 which is pivotally supported by the beam 18 and to the other arm of the said bell crank one extremity of a rod 8 is connected as by a floating pivotal mounting. Extending from the wing 1 and pivotally connected thereto at one extremity is a member 11 on the opposite extremity of which a suitable pivotal mounting 10 is provided which is connected both to the rod 8 and also to one extremity of a link 9 the opposite end of which is pivotally attached to the aileron 3.

Movement of the rod 12 imparts movement to the flap 2 about its pivotal mounting 11' on the main wing 1 through the link 14, the triangular member 16 and the reach rod 17, and if the pin 11' and the pivotal mounting 10 are in transverse alignment and the rod 50 is held stationary the aileron 3 will move with the said flap so that their relative positions remain the same. But if the pin 11' and the mounting 10 are not in alignment turning movement of the flap 2 in one direction imparts rotary movement to the aileron 3 in the opposite direction. By independent movement of the rod 50 in either direction the inclination of the aileron 3 may be adjusted as required.

Figure 2:
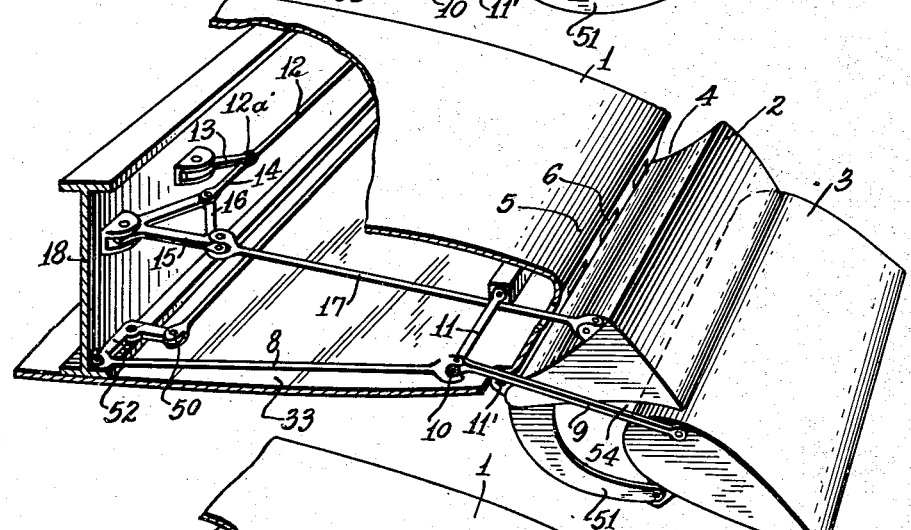
Figure 2 is a similar view showing the flap and aileron in position for starting or landing.

When the flap 2 is inclined at its maximum angle to the wing 1, as shown in Figure 2 to form the groove 4, the triangular member 16 is so disposed that its side 15, extending between its corner pivotally supported by the beam 18, and its corner on which the reach rod 17 is pivoted, lies in alignment with the said reach rod. Then any strains or stresses exerted through the latter from the flap 2 are transmitted to the beam and not to the operating rod. Again when the flap 2 is in the position shown in Figure 1 the arm 13 and the link 14 are in alignment so that the stresses and strains from the flap 2 are again transmitted to the beam 18. Thus when the flap 2 is at either end of its pivotal movement no strains exerted thereon are transferred to the operating rod 12.

Figure 3:
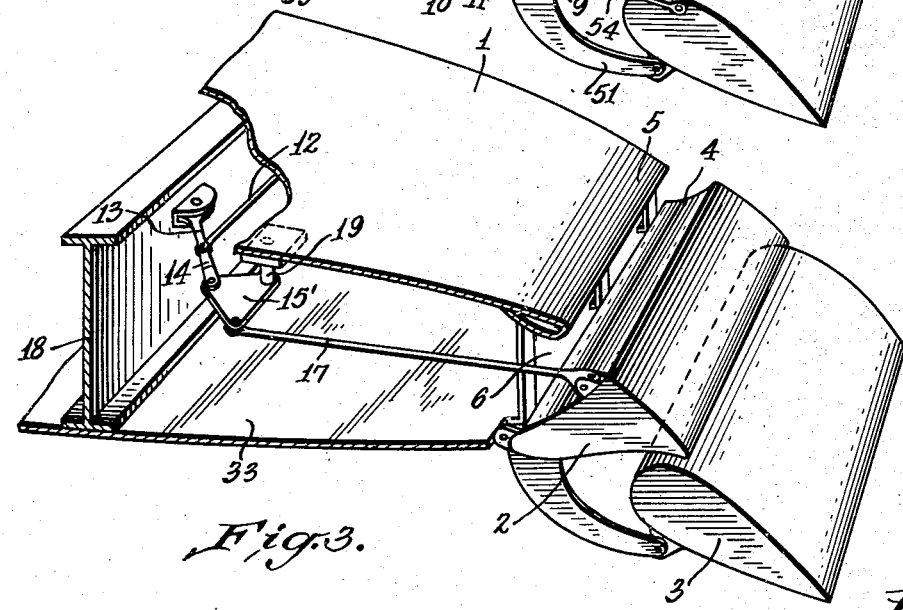
Figure 3 is a perspective view showing a modified arrangement of the portion of the operating mechanism which moves the flap.

Referring now to the modification shown in Figure 3 wherein only a somewhat different operating mechanism for the flap 2 is shown; in this case the triangular member 15' is pivotally mounted on the wing 1 intermediately of the width of the passage 33 by a pin 19. Otherwise the arrangement of the operating rod 12, arm 13, link 14 and reach rod 17 are the same. The purpose of this arrangement is to provide another way the operating rod 12 may be relieved of stresses from the flap 2 when the latter is either in position to close the openings 6 or to provide a groove 4 of greatest cross section. In this case the arrangement of the member 15' is such that when the flap is at its maximum inclination the arm 13 and link 14 are in alignment and when the flap is in normal flight position one side of the triangular member is in alignment with the reach rod 17.

From the foregoing it will be clearly seen that by the construction hereinbefore described the flaps 2 may be inclined to the wing 1 to form a groove for the passage of air into or from the openings 6 of the passage 33 to increase the lifting power when starting or landing; that movement of the ailerons, which may be accomplished either with or independently of the flaps, provides effective banking due to the suction or discharge of air through the wing openings from or into the skin layer; and that due to the transverse spacing of the aileron from the flap the aileron is provided with aerodynamic balance.

While in the foregoing the preferred embodiments of the invention have been described and shown, the invention is susceptible to such alterations and modifications as fall within the scope of the appended claims.

What we claim is:

1. An airplane wing structure comprising a main wing having a passage therein and openings therethrough connecting said passage with the skin layer exteriorly of the wing, a flap supported by the wing rearwardly thereof for pivotal movement about its lower edge, said flap when at the limit of its upward pivotal movement being adapted to close said openings and being operable to form a variable slot communicating with the openings when swung downwardly, and an aileron pivotally supported by the flap.

2. An airplane wing structure comprising the combination set forth in claim 1, wherein a mechanism is provided by which the flap and the aileron are adapted to be pivotally moved relative to the main wing.

3. An airplane wing structure comprising the combination set forth in claim 1, wherein a mechanism is provided by which the flap and aileron are adapted to be moved pivotally in opposite directions.

4. An airplane wing structure comprising the combination set forth in claim 1, wherein separate means are provided for moving the flap and aileron pivotally.

5. An airplane wing structure comprising a main wing having a passage therein and openings therethrough connecting said passage with the skin layer exteriorly of the wing, a flap pivotally supported by the wing rearwardly thereof, an aileron pivotally supported by the flap, and means carried by said wing for moving the flap pivotally, said means including a pair of coacting pivoted portions adapted to lie in alignment when the flap is at one limit of its pivotal movement to absorb stresses exerted on said flap.

6. An airplane wing structure comprising a main wing having a passage therein and openings therethrough connecting said passage with the skin layer exteriorly of the wing, a flap pivotally supported by the wing rearwardly thereof, an aileron pivotally supported by the flap, and means carried by said wing for moving the flap pivotally, said means including two coacting pairs of pivoted portions, one coacting pair being adapted to lie in alignment when the flap is at each limit of its pivotal movement to absorb stresses exerted on said flap.

7. An airplane wing structure comprising the combination set forth in claim 1, including a mechanism for moving the flap pivotally, a rod for actuating said mechanism, and means in said mechanism for absorbing stresses exerted on the flap.

8. An airplane wing structure comprising a main wing, a flap pivotally supported by the latter and rearwardly thereof, said flap being adapted to rest against said wing, the wing having a transverse passage formed therethrough and transversely arranged openings from the passage adapted to connect the latter with the skin layer exteriorly of the wing, said flap being adapted to rest against said wing and close said openings, and an aileron pivotally supported by said flap.

9. An airplane wing structure comprising a main wing, a flap pivotally supported by the latter and rearwardly thereof, said flap being adapted to rest transversely against said wing, the wing having a transverse passage formed therethrough and a transversely arranged row of openings from the passage adapted to connect the latter with the skin layer exteriorly of the wing, said openings extending rearwardly and outwardly through the wing portion of greatest curvature, said flap being adapted to close said passages or to be moved pivotally to expose said openings and form a substantially V-shaped groove between it and said wing, and an aileron pivotally supported by said flap and spaced therefrom in all pivotal positions thereof.

HANS GROPLER.
ERWIN HANDKE.